US011857475B1

(12) United States Patent
Carrano et al.

(10) Patent No.: US 11,857,475 B1
(45) Date of Patent: Jan. 2, 2024

(54) DETACHABLE COMMODE

(71) Applicants: Diana M. Carrano, Woodbridge, CT (US); Helen Kachere, Bridgeport, CT (US)

(72) Inventors: Diana M. Carrano, Woodbridge, CT (US); Helen Kachere, Bridgeport, CT (US)

( * ) Notice: Subject to any disclaimer, the term of this patent is extended or adjusted under 35 U.S.C. 154(b) by 1 day.

(21) Appl. No.: 17/895,012

(22) Filed: Aug. 24, 2022

(51) Int. Cl.
*A61G 7/02* (2006.01)
*A47K 11/04* (2006.01)

(52) U.S. Cl.
CPC ................ *A61G 7/02* (2013.01); *A47K 11/04* (2013.01)

(58) Field of Classification Search
CPC .................................. A61G 7/02; A47K 11/04
USPC ............................................................... 4/480
See application file for complete search history.

(56) References Cited

U.S. PATENT DOCUMENTS 1,046,830 A * 12/1912 McDonald ............... A61G 7/02 5/604
1,405,476 A * 2/1922 Thompson ........... A61G 7/0503 5/308
5,327,599 A 7/1994 Bradley, Jr.
5,685,034 A 11/1997 Kleer et al.
6,009,570 A 1/2000 Hargest et al.
6,101,646 A 8/2000 Son
6,128,788 A 10/2000 Yamazaki
6,647,571 B2 11/2003 Hynansky
8,171,583 B1 5/2012 Hooker et al.
8,510,881 B1 * 8/2013 Lee ........................ A61G 9/003 5/604
9,038,215 B2 5/2015 Al-Jafar
9,918,887 B1 3/2018 Wolter, III
10,821,042 B1 11/2020 Williams
2003/0213065 A1 * 11/2003 Bristotti ............. A61G 7/05715 5/604

* cited by examiner

*Primary Examiner* — Huyen D Le
(74) *Attorney, Agent, or Firm* — Cramer Patent & Design PLLC; Aaron R. Cramer

(57) ABSTRACT

The present invention is directed to a detachable commode. The detachable commode may comprise a commode storage bracket, a commode, and a pail. The commode storage bracket may be coupled to the underside of the bed frame of a bed. The commode may be stored under the bed supported by the commode storage bracket. The commode may be removed from the commode storage bracket when needed. The commode may hold the pail such that the commode may be operable as a toilet. The commode may be adapted for a patient to sit on a seat of the commode and while urinating and/or defecating into the pail. As non-limiting examples, the bed may be a hospital bed and the commode storage bracket may be added onto the bed or may be built into the bed.

20 Claims, 7 Drawing Sheets

DETACHABLE COMMODE

RELATED APPLICATIONS

Non-applicable.

FIELD OF THE INVENTION

The present invention relates generally to a commode which is capable of being moveably secured to a bed frame.

BACKGROUND OF THE INVENTION

Spending time in a hospital bed is perhaps one of the most unenjoyable parts of human life. One of the big factors associated with this time that is dreaded by all is the use of the bed pan. Not only is the use of bed pan uncomfortable, but it also taxes the patient's dignity as well. Those who are mobile may be able to use the bathroom either in the room or hallway, but certainly require the presence or assistance of medical personnel. This is to prevent falls, as falls in a hospital are unwanted by both the hospital and certainly the patient whose medical condition will certainly worsen.

While a portable bedside commode may also be used, they take up valuable space in an otherwise crowded room. Accordingly, there exists a need for a means by which toilet facilities for hospital patients can be provided to address the concerns as described above. The development of the detachable commode fulfills this need.

SUMMARY OF THE INVENTION

The principles of the present invention provide for a detachable commode which has a commode storage bracket which is coupled to an underside of a bed frame of a bed, the bed having a head and a foot, the commode storage bracket includes a bracket frame that couples to the underside of the bed frame of the bed, a commode which is stored under the bed supported by the commode storage bracket, the commode includes a seat, a plurality of legs, a seat back, and one or more handles, a pail which is held by the commode adapted for a patient to sit on the seat of the commode and while urinating and/or defecating into the pail and the commode serves as a toilet, a lip which is disposed on the top of the pail to prevent the pail from passing entirely through the pail aperture and a lid which is hingedly attached to the seat directly rearward of the pail aperture.

The bed may be a hospital bed and the commode storage bracket may be added onto the bed or is built into the bed. The commode storage bracket may be located adjacent to the foot of the bed. The commode storage bracket may be added to the bed frame of the bed using a plurality of mounting hardware. The mounting hardware may be selected from the group consisting of a plurality of screws, a plurality of nuts, a plurality of bolts, a plurality of washers, a plurality of rivets, a plurality of crossbars, a plurality of hooks, a plurality of collars, a plurality of nipples, a plurality of cams, a plurality of standoffs, a plurality of knobs, a plurality of caps, a plurality of plates, a plurality of rails, a plurality of lips, or a plurality of brackets.

The commode storage bracket may be built into the bed frame of the bed as an integral part of the bed frame of the bed. The commode storage bracket may include a pair of slides which is located at the bottom of the commode storage bracket, and which is oriented to point towards a center of the commode storage bracket such that the commode rests on and between the pair of slides when not in use. The pair of slides may be a pair of L-channels. The commode may be removed from the commode storage bracket when needed.

The seat may be a horizontally-oriented surface that includes a pail aperture. The pail aperture may match an uppermost edge of the pail. The legs may elevate the seat above the floor. The legs may include four individual leg assemblies that are hingedly coupled to an underside of the seat at each corner of the seat.

The legs may include a pair of U-shaped legs that are hingedly coupled to the underside of the seat at opposing ends of the seat. The legs pivot up to a position that may be parallel to the seat for storing the commode and pivot down to a position substantially perpendicular to the seat for use. The legs may be adapted to lock in the up position such that the legs remain up while the commode is stored beneath the bed. The seat back may be coupled to a top surface of the seat behind the lid and is adapted to prevent the patient from sliding off the rear of the seat. The one or more handles may be fixedly coupled to the top surface of the seat on one or both sides of the pail aperture and are adapted for the patient to grasp for support. A height of the seat may be adjusted by varying a length of the legs with one or more height adjustment mechanisms. The one or more height adjustment mechanisms each may include an upper leg section with a plurality of height adjustment apertures and a lower leg section with a spring-loaded button, where the upper leg section is a larger diameter than the lower leg section such that the lower leg section slides into and out of the upper leg section.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
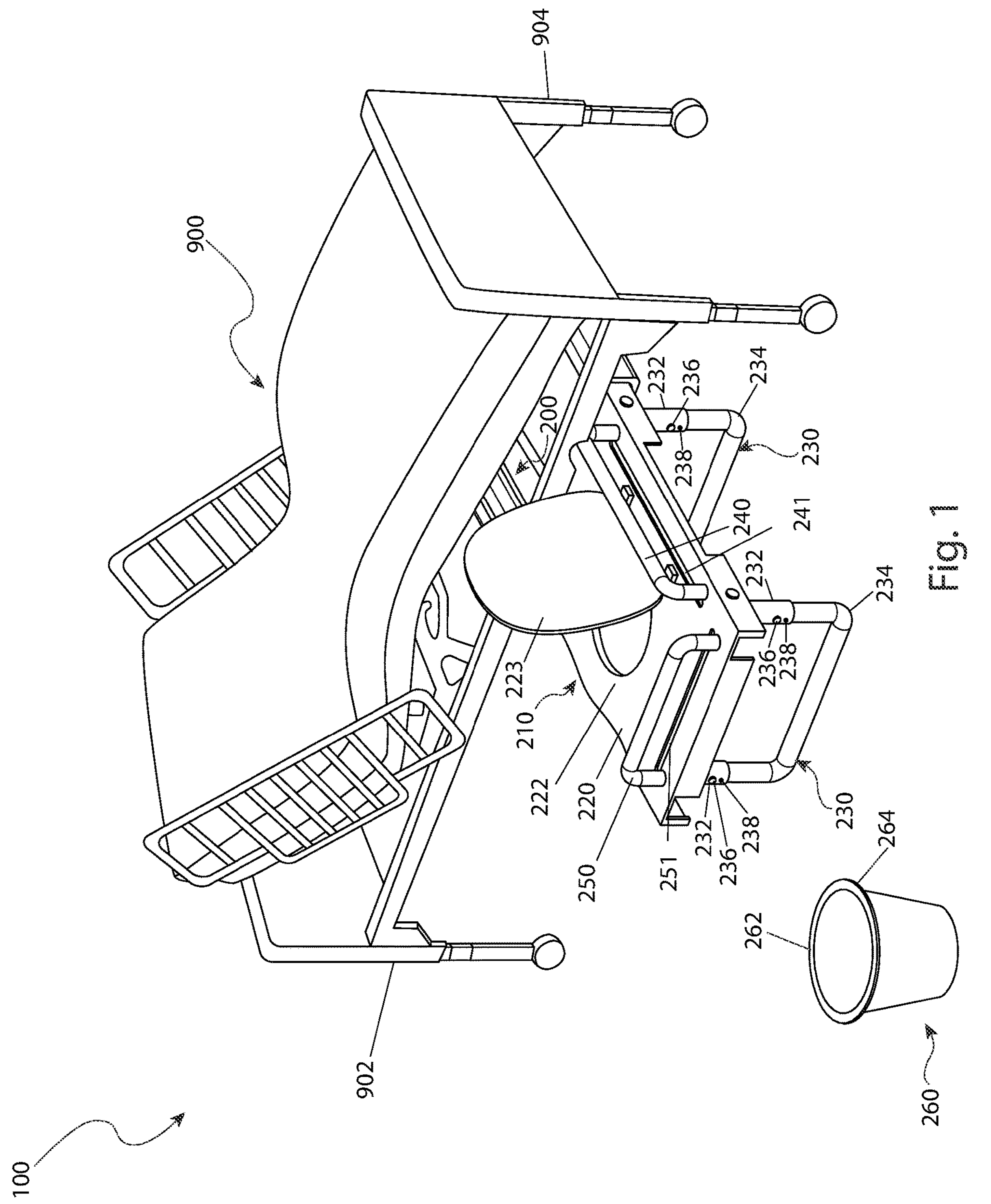
FIG. 1 is an isometric view of a detachable commode, according to an embodiment of the present invention, illustrating the commode pulled out from under the bed.
Figure 2:
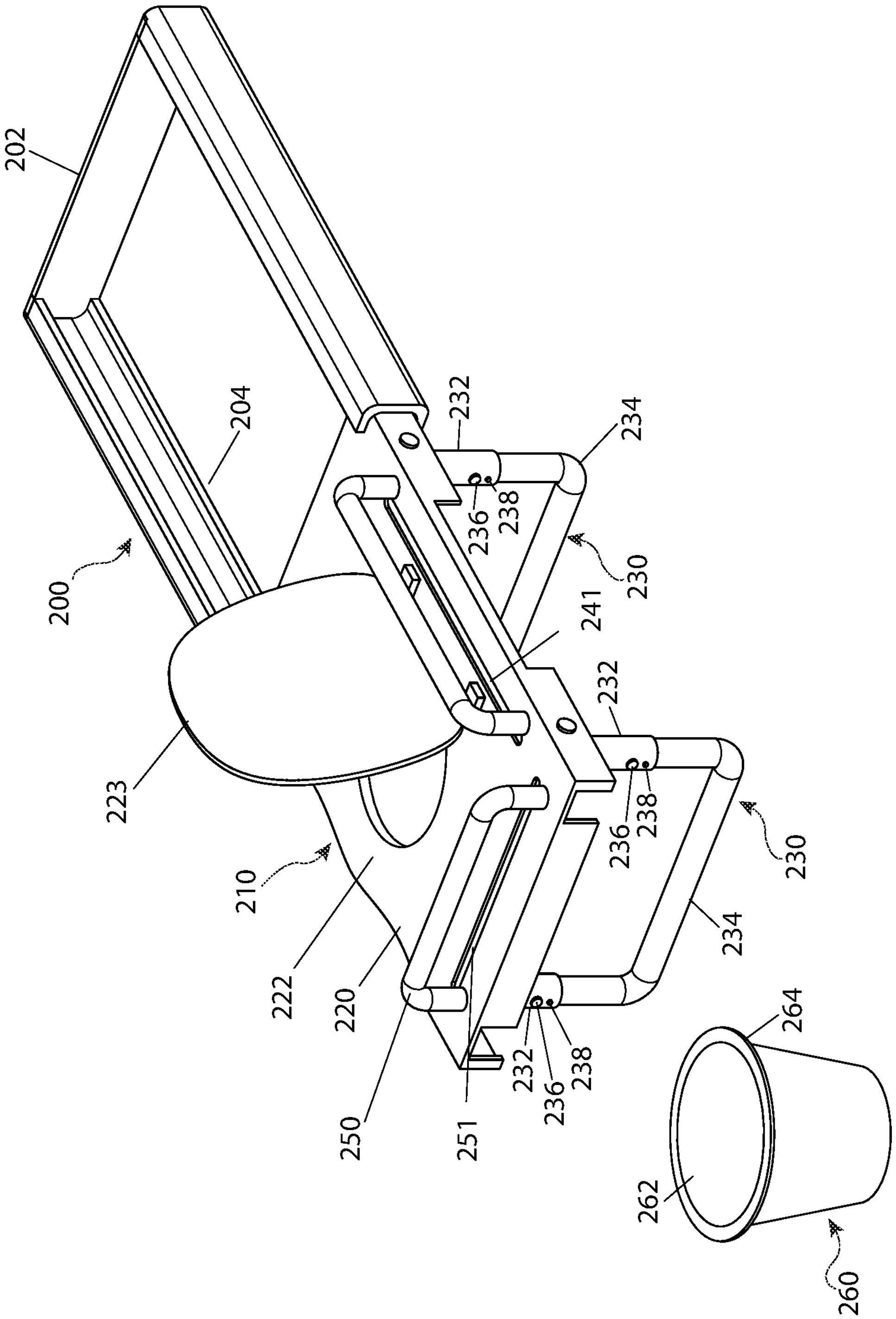
FIG. 2 is an isometric view of a detachable commode, according to an embodiment of the present invention.
Figure 3:
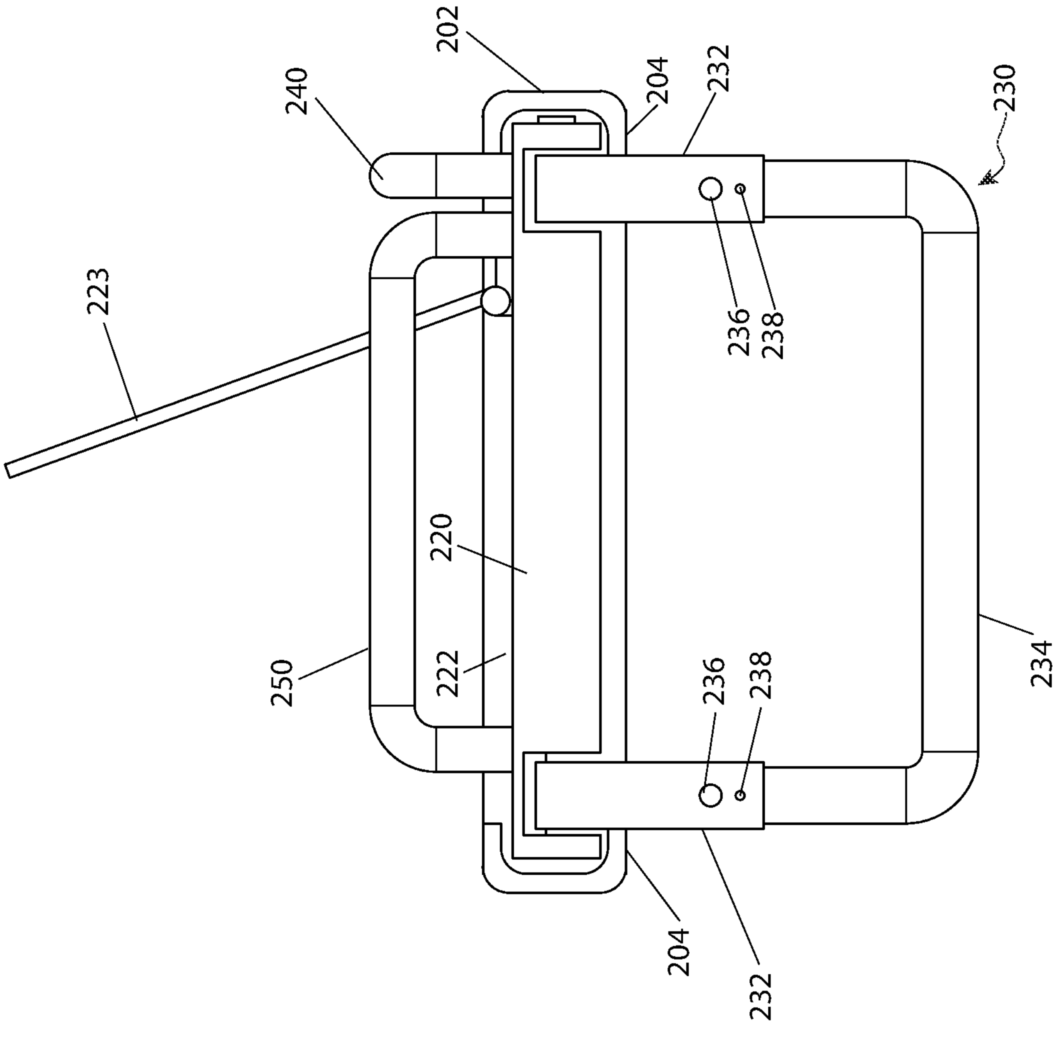
FIG. 3 is a right side view of a detachable commode, according to an embodiment of the present invention.
Figure 4:
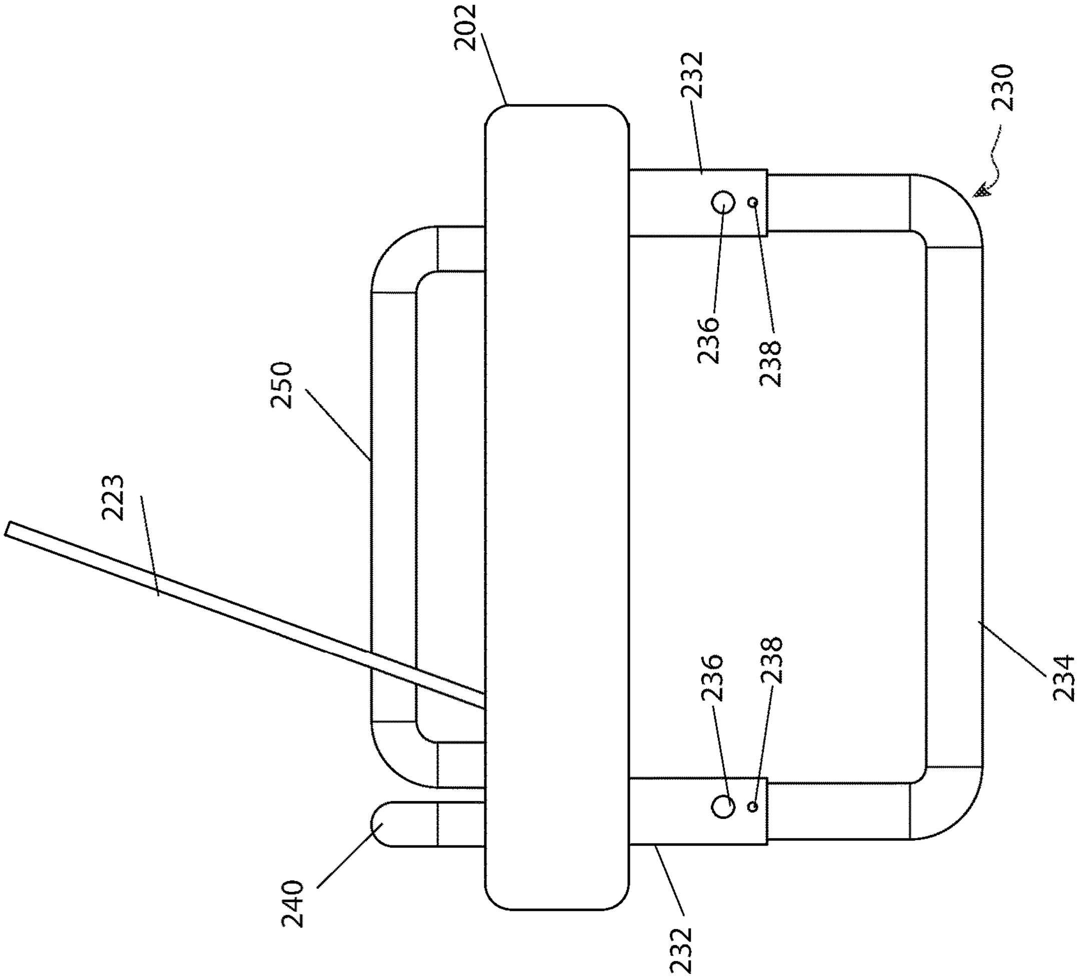
FIG. 4 is a left side view of a detachable commode, according to an embodiment of the present invention.
Figure 5:
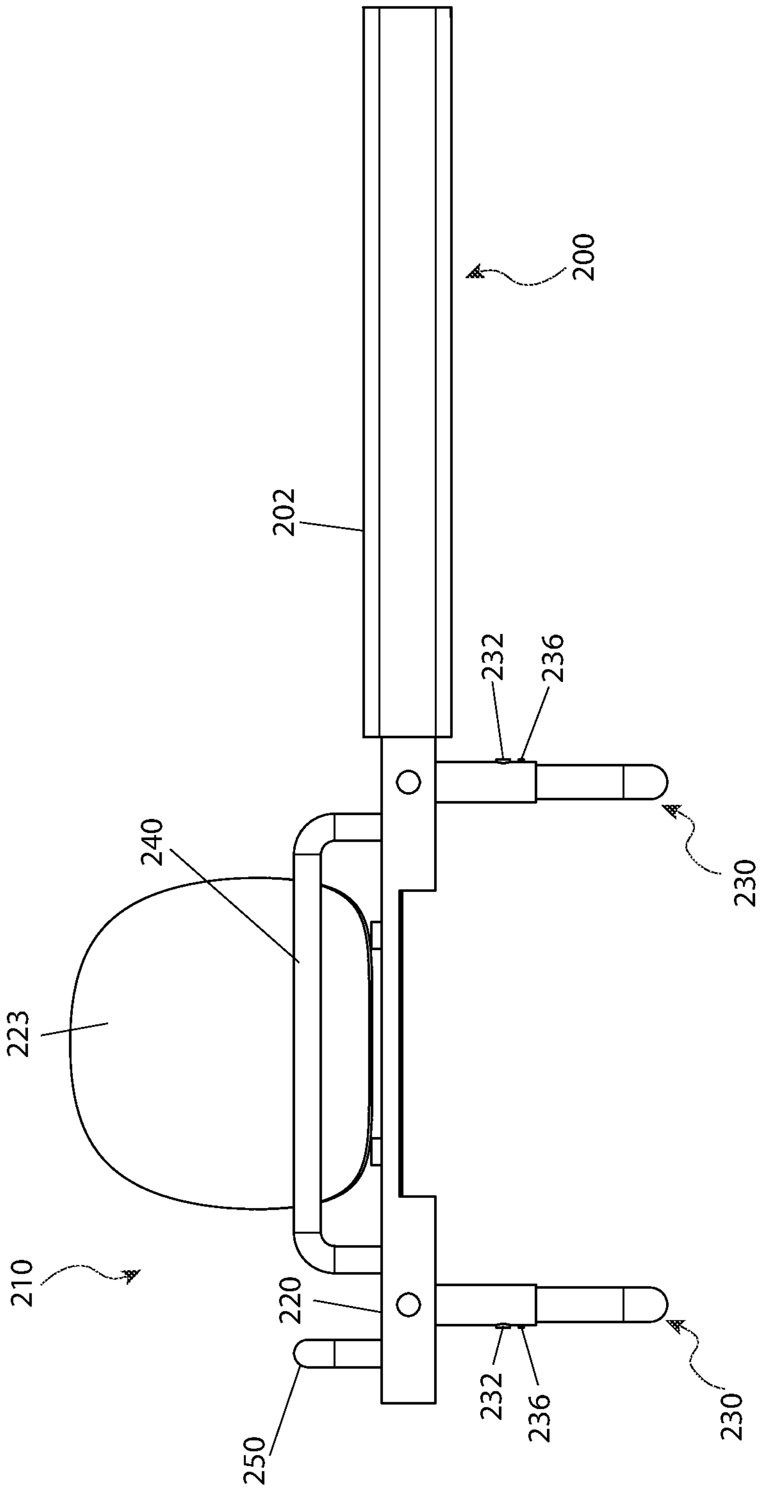
FIG. 5 is a rear view of a detachable commode, according to an embodiment of the present invention.
Figure 6:
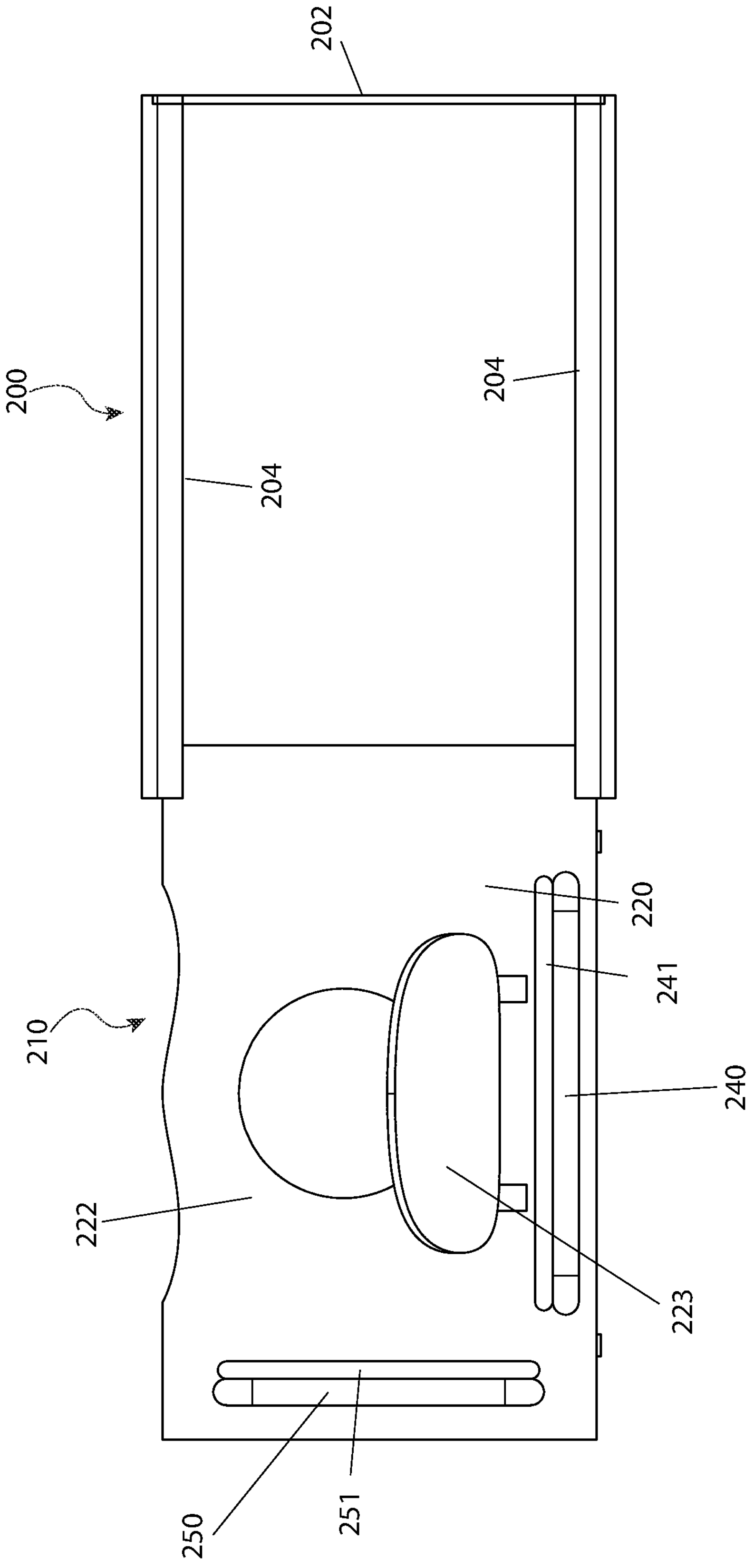
FIG. 6 is a top view of a detachable commode, according to an embodiment of the present invention.
Figure 7:
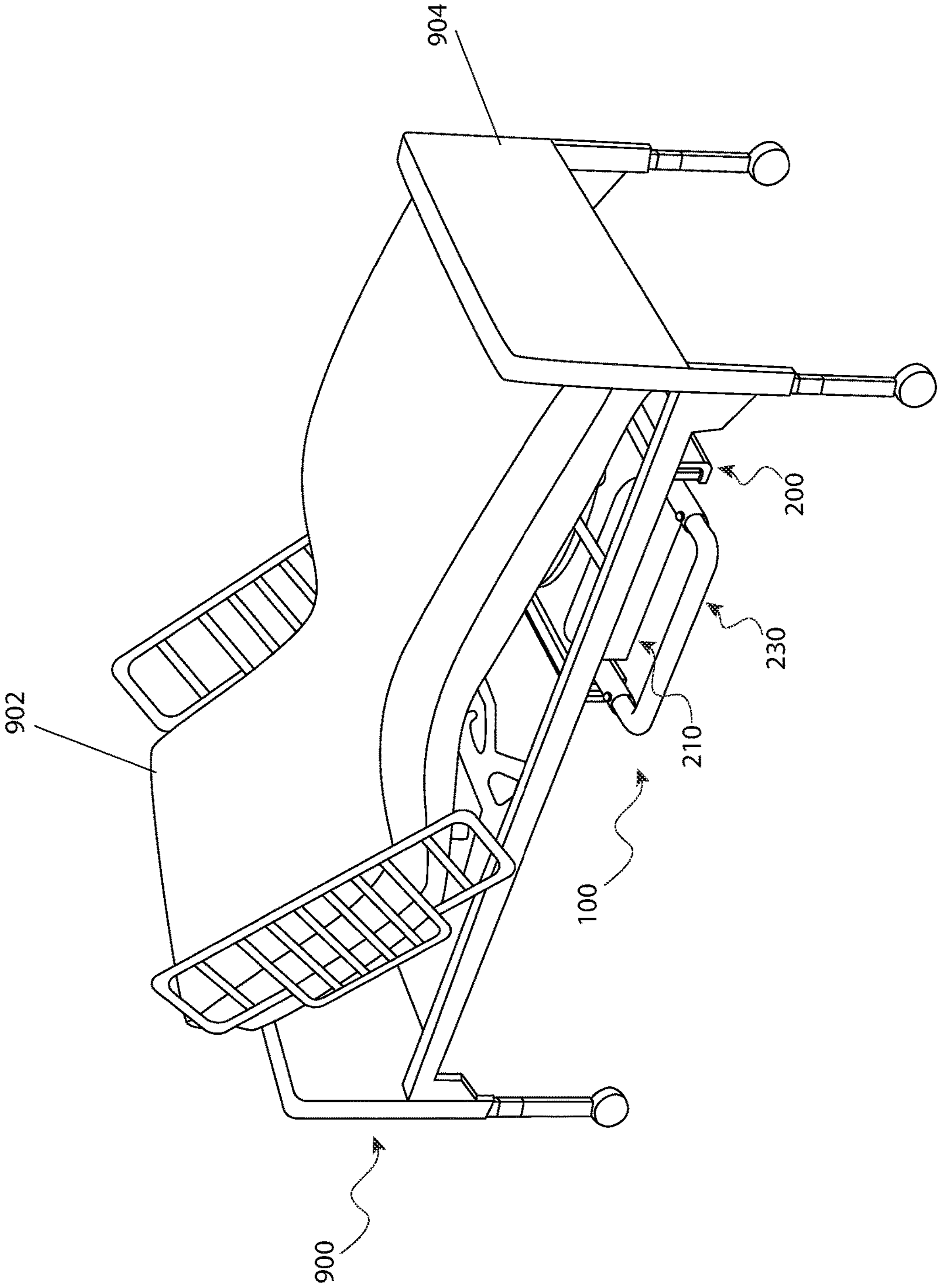
FIG. 7 is an isometric view of a detachable commode, according to an embodiment of the present invention, illustrating the commode stored under the bed.

100 detachable commode
200 commode storage bracket
202 bracket frame
204 slide
210 commode
220 seat
222 pail aperture
223 lid
230 leg
232 upper leg section
234 lower leg section

236 spring-loaded button
238 height adjustment aperture
240 seat back
241 seat back slot
250 handle
251 handle slot
260 pail
262 top aperture
264 lip
900 bed
902 head of bed
904 foot of bed 1. Description of the Invention The present invention is directed to a detachable commode (herein described as the "invention") 100. The invention 100 may comprise a commode storage bracket 200, a commode 210, and a pail 260. The commode storage bracket 200 may be coupled to the underside of the bed frame of a bed 900, having a head of bed 902 and a foot of bed 904. The commode 210 may be stored under the bed 900 supported by the commode storage bracket 200. The commode 210 may be removed from the commode storage bracket 200 when needed. The commode 210 may hold the pail 260 such that the commode 210 may be operable as a toilet. The commode 210 may be adapted for a patient to sit on a seat 220 of the commode 210 and while urinating and/or defecating into the pail 260. As non-limiting examples, the bed 900 may be a hospital bed and the commode storage bracket 200 may be added onto the bed 900 or may be built into the bed 900. In a preferred embodiment, the commode storage bracket 200 is located adjacent to the foot of bed 904.

The commode storage bracket 200 may comprise a bracket frame 202 that couples to the underside of the frame of the bed 900. In some embodiments, the commode storage bracket 200 may be added to the frame of the bed 900 using mounting hardware. As used herein, mounting hardware may refer to mechanical devices that are used to attach one object to another, including devices whose only purpose is to improve aesthetics. As non-limiting examples, the mounting hardware may comprise screws, nuts, bolts, washers, rivets, crossbars, hooks, collars, nipples, cams, standoffs, knobs, caps, plates, rails, lips, brackets, or any combination thereof In some embodiments, the commode storage bracket 200 may be built into the frame of the bed 900 as an integral part of the frame of the bed 900.

The commode storage bracket 200 may comprise a pair of slides 204 which may be located at the bottom of the commode storage bracket 200 and which may be oriented to point towards the center of the commode storage bracket 200 such that the commode 210 may rest on and between the pair of slides 204 when not in use. As a non-limiting example, the pair of slides 204 may be a pair of L-channels.

The commode 210 may be a piece of furniture that may be operable as a toilet. The commode 210 may comprise the seat 220, a plurality of legs 230, a seat back 240, and one (1) or more handles 250. The commode 210 may be operable to support the pail 260. The commode 210 may be adapted for the patient to sit upon while using the commode 210.

The seat 220 may be a horizontally-oriented surface comprising a pail aperture 222. The seat 220 may be adapted to support the weight of the patient. The pail aperture 222 may be located at the center of the seat 220. The pail aperture 222 may be operable to support the pail 260. The shape of the pail aperture 222 may match the footprint of the uppermost edge of the pail 260. A lip 264 on the top of the pail 260 may prevent the pail 260 from passing entirely through the pail aperture 222. A lid 223 is hingedly attached to the seat 220, directly rearward of the pail aperture 222, for selective covering thereof The plurality of legs 230 may elevate the seat 220 above the floor. As non-limiting examples, the plurality of legs 230 may comprise four (4) individual leg assemblies 230 that may be hingedly coupled to the underside of the seat 220 at each corner of the seat 220 or they may comprise two (2) U-shaped legs that may be hingedly coupled to the underside of the seat 220 at opposing ends of the seat 220.

The plurality of legs 230 may pivot up to a position that is parallel to the seat 220 for storing the commode 210 and may pivot down to a position substantially perpendicular to the seat 220 for use. The plurality of legs 230 may be adapted to lock in the up position such that the plurality of legs 230 remain up while the commode 210 is stored beneath the bed 900. The plurality of legs 230 may be adapted to lock in the down position such that the commode 210 is stable and safe for the patient to sit upon. The plurality of legs 230 may be adapted to be unlocked by a caregiver before pivoting between the up position and the down position.

In some embodiments, the height of the seat 220 may be adjusted by varying the length of the plurality of legs 230. An individual leg selected from the plurality of legs 230 may comprise one (1) or more height adjustment mechanisms. As a non-limiting example, an individual height adjustment mechanism may comprise an upper leg section 232 with a plurality of height adjustment apertures 238 and a lower leg section 234 with a spring-loaded button 236 where the upper leg section 232 is a larger diameter than the lower leg section 234 such that the lower leg section 234 may slide into and out of the upper leg section 232. The spring-loaded button 236 may engage one (1) of the plurality of height adjustment apertures 238 to retain the individual leg at a specific height. The spring-loaded button 236 may be adapted to be pressed by the caregiver to disengage from the plurality of height adjustment apertures 238 such that the lower leg section 234 may slide to change the length of the individual leg. The spring-loaded button 236 may re-engage one of the plurality of height adjustment apertures 238 when the spring-loaded button 236 aligns with one of the plurality of height adjustment apertures 238.

The seat back 240 may be coupled to the top surface of the seat 220 behind the lid 223. The seat back 240 may be adapted to prevent the patient from sliding off the rear of the seat 220. The height of the seat back 240 may be selected to fit within the space available between the top surface of the seat 220 and the bottom of the bed frame. A seatbelt is capable of securing around a portion of a user and may be attachable to the seat back 240. The seat back 240 is secured within a seat back slot 241 of the seat 220 and is vertically movably adjustable therein. This vertical adjustment may be necessary in order to store the commode 210 under the bed 900.

The one (1) or more handles 250 may be fixedly coupled to the top surface of the seat 220 on one (1) or both sides of the pail aperture 222. The one (1) or more handles 250 may be adapted for the patient to grasp for support. The height of the one (1) or more handles 250 may be selected to fit within the space available between the top surface of the seat 220 and the bottom of the bed frame. Each handle 250 is secured within a handle slot 251 of the seat 220 and is vertically movably adjustable therein. This vertical adjustment may be necessary in order to store the commode 210 under the bed 900.

In some embodiments, the seat back 240 and/or the one (1) or more handles 250 may pivot to a position that is parallel to the top surface of the seat 220 such that a taller seatback may be used without interfering with under-the-bed storage of the commode 210.

The pail 260 may be an open top container for holding urine and excrement. As a non-limiting example, the pail 260 may be emptied, cleaned, and stored in a patient bathroom when not in use. The pail 260 may be lowered into the pail aperture 222 on the commode 210 for use. The pail 260 may comprise a top aperture 262 through which the pail 260 may be filled and emptied. The pail 260 may comprise the lip 264 surrounding the top aperture 262 to prevent the pail 260 from passing through the pail aperture 222 of the seat 220.

In use, the commode 210 may be stored beneath the bed 900 in the commode storage bracket 200. The pail 260 may be stored in a clean state in the patient bathroom. When a patient with ambulatory limitations indicates that they must use a toilet, the caregiver may retrieve the pail 260 from the patient bathroom and bring the pail 260 to the side of the bed 900. The caregiver may slide the commode 210 from under the bed 900 and pivot the plurality of legs 230 downward. If necessary, the height of the seat 220 may be adjusted using the one (1) or more height adjustment mechanisms on the plurality of legs 230. The commode 210 may be extracted from the commode storage bracket 200 and placed free-standing next to the bed 900. The pail 260 may be lowered into the pail aperture 222 on the seat 220. The caregiver may assist the patient in swinging the patient's legs over the side of the bed 900 and standing in front of the commode 210. The patient may turn and sit on the commode 210 to urinate and/or defecate. After cleaning, the patient may stand, turn, and sit on the bed 900. The caregiver may assist the patient in lifting the patient's legs onto the bed 900. The pail 260 may be removed from the commode 210, carried to the patient bathroom, emptied, and cleaned. The commode 210 may be returned to the commode storage bracket 200 where the plurality of legs 230 may be pivoted up and the commode storage bracket 200 may slide into place beneath the bed 900.

The availability of the commode 210 within the bed 900 addresses issues of timely access to a toilet, cross-contamination between patients when toilets are shared, and effective use of space within a patient room.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A detachable commode, comprising:

a commode storage bracket coupled to an underside of a bed frame of a bed, the bed having a head and a foot, the commode storage bracket includes a bracket frame that couples to the underside of the bed frame of the bed;

a commode stored under the bed supported by the commode storage bracket, the commode includes a seat, a plurality of legs, a seat back, and one or more handles;

a pail held by the commode adapted for a patient to sit on the seat of the commode and while urinating and/or defecating into the pail and the commode serves as a toilet;

a lip disposed on the top of the pail to prevent the pail from passing entirely through a pail aperture; and a lid hingedly attached to the seat directly rearward of the pail aperture.

2. The detachable commode, according to claim 1, wherein the bed is a hospital bed and the commode storage bracket is added onto the bed or is built into the bed.

3. The detachable commode, according to claim 1, wherein the commode storage bracket is located adjacent to the foot of the bed.

4. The detachable commode, according to claim 1, wherein the commode storage bracket is added to the bed frame of the bed using a plurality of mounting hardware.

5. The detachable commode, according to claim 4, wherein the mounting hardware is selected from the group consisting of a plurality of screws, a plurality of nuts, a plurality of bolts, a plurality of washers, a plurality of rivets, a plurality of crossbars, a plurality of hooks, a plurality of collars, a plurality of nipples, a plurality of cams, a plurality of standoffs, a plurality of knobs, a plurality of caps, a plurality of plates, a plurality of rails, a plurality of lips, or a plurality of brackets.

6. The detachable commode, according to claim 1, wherein the commode storage bracket is built into the bed frame of the bed as an integral part of the bed frame of the bed.

7. The detachable commode, according to claim 1, wherein the commode storage bracket includes a pair of slides which is located at the bottom of the commode storage bracket and which is oriented to point towards a center of the commode storage bracket such that the commode rests on and between the pair of slides when not in use.

8. The detachable commode, according to claim 7, wherein the pair of slides are a pair of L-channels.

9. The detachable commode, according to claim 1, wherein the commode is removed from the commode storage bracket when needed.

10. The detachable commode, according to claim 1, wherein the seat is a horizontally-oriented surface that includes a pail aperture.

11. The detachable commode, according to claim 10, wherein the pail aperture matches an uppermost edge of the pail.

12. The detachable commode, according to claim 1, wherein the legs elevate the seat above the floor.

13. The detachable commode, according to claim 1, wherein the legs include 4 individual leg assemblies that are hingedly coupled to an underside of the seat at each corner of the seat.

14. The detachable commode, according to claim 13, wherein the legs include a pair of U-shaped legs that are hingedly coupled to the underside of the seat at opposing ends of the seat.

15. The detachable commode, according to claim 1, wherein the legs pivot up to a position that is parallel to the seat for storing the commode and pivot down to a position substantially perpendicular to the seat for use.

16. The detachable commode, according to claim 1, wherein the legs are adapted to lock in the up position such that the legs remain up while the commode is stored beneath the bed.

17. The detachable commode, according to claim 1, wherein the seat back is coupled to a top surface of the seat behind the lid and is adapted to prevent the patient from sliding off the rear of the seat.

18. The detachable commode, according to claim 17, wherein the one or more handles fixedly coupled to the top surface of the seat on one or both sides of the pail aperture and are adapted for the patient to grasp for support.

19. The detachable commode, according to claim 1, wherein a height of the seat is adjusted by varying a length of the legs with one or more height adjustment mechanisms.

20. The detachable commode, according to claim 19, wherein the one or more height adjustment mechanisms each include an upper leg section with a plurality of height adjustment apertures and a lower leg section with a spring-loaded button, where the upper leg section is a larger diameter than the lower leg section such that the lower leg section slides into and out of the upper leg section.

* * * * *